R. S. HOYT.
ARTIFICIAL LINE
APPLICATION FILED JAN. 24, 1917.

1,240,213.

Patented Sept. 18, 1917.
4 SHEETS—SHEET 4.

INVENTOR
Ray S. Hoyt
BY
Thomas D. Lockwood
ATTORNEY

UNITED STATES PATENT OFFICE.

RAY S. HOYT, OF BROOKLYN, NEW YORK, ASSIGNOR TO AMERICAN TELEPHONE AND TELEGRAPH COMPANY, A CORPORATION OF NEW YORK.

ARTIFICIAL LINE.

1,240,213.  Specification of Letters Patent.  Patented Sept. 18, 1917.

Application filed January 24, 1917. Serial No. 144,137.

*To all whom it may concern:*

Be it known that I, RAY S. HOYT, residing at Brooklyn, in the county of Kings and State of New York, have invented certain Improvements in Artificial Lines, of which the following is a specification.

This invention relates to an artificial line and more particularly it relates to an artificial line associated with a non-loaded cable circuit or a uniformly loaded cable. Its object is to provide a simple circuit arrangement, consisting of condensers and non-inductive resistances which shall, over the range of frequencies essential for the telephonic transmission of speech, closely simulate in its electrical impedance, the characteristic impedance of the associated cable circuit.

The cable circuit with which the artificial line of my invention is adapted to coöperate, is characterized by relatively large distributed capacity and relatively small distributed inductance. As a consequence its impedance characteristics differ markedly from those of open wire lines or of ordinary loaded circuits. In previous inventions I have disclosed artificial lines adapted to simulate in their characteristic impedances open wire lines and loaded lines. My present invention consists of an artificial line adapted to simulate in its impedance characteristics a non-loaded cable circuit or a uniformly loaded cable circuit, *i. e.* a cable in which the loading is uniformly distributed throughout the length of the cable instead of being lumped at suitable intervals, the artificial line being a simple electrical net-work containing a small number of elements.

My invention is capable of many and varied uses but is of particular utility as a balancing artificial line in two-way two-repeater circuits wherein the artificial line must closely simulate the impedance characteristics of the transmission line with which it is associated.

Figure 1:
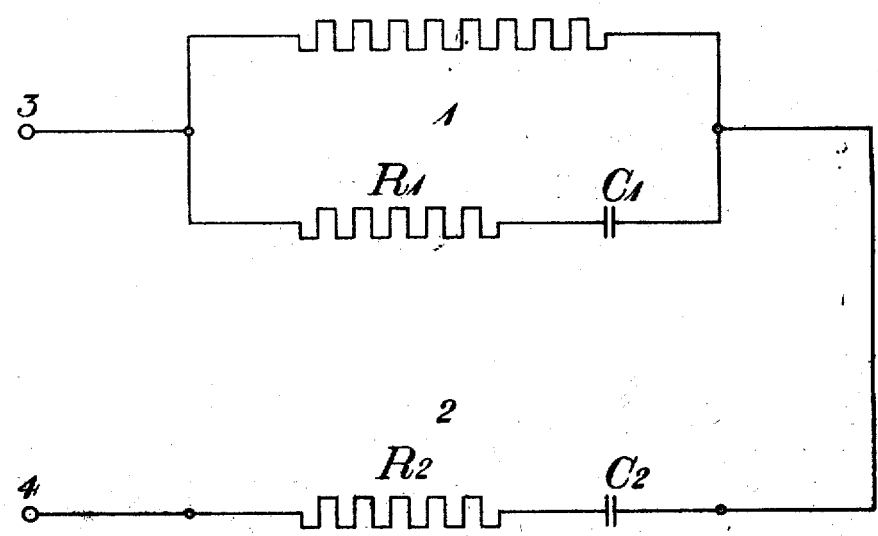

My invention is best understood by reference to the accompanying drawings in which Figure 1 is a diagram of the artificial line of my invention and Figs. 2, 3, 4, 5, 6 and 7 are plots of the impedance characteristics of cable circuits and of the artificial line.

Referring to Fig. 1 the artificial line will be seen to consist of two parts 1 and 2 serially connected between terminals 3 and 4. The part 1 comprises a non-inductive resistance element $R_0$ in parallel with a second non-inductive resistance element $R_1$ and a condenser $C_1$, while part 2 comprises a third non-inductive resistance element $R_2$ in series with a second condenser $C_2$. The artificial line is thus made up of five impedance elements only. The resultant impedance of the combination when the elements are proportioned, as hereinafter set forth in this specification, with reference to the constants of the particular cable with which said line is to coöperate, closely simulates the impedance of the cable circuit over the range of frequencies necessary for the telephonic transmission of speech.

Proceeding now to derivation of the appropriate proportioning of the artificial line, let K be the characteristic impedance of the cable circuit; R, L and C the distributed resistance, inductance and capacity per unit length of said cable circuit, Z the impedance of the part or portion 1 of the artificial line; $Z_2$ the impedance of the portion 2; $i$ the imaginary operator $\sqrt{-1}$; and $p = 2\pi f$ where $f$ is the frequency in cycles per second. The well known formulæ for the impedances K, Z and $Z_2$ are then given by the following equations:

$$K = D - iQ = \sqrt{\frac{R + ipL}{ipC}} = (1-i)\sqrt{\frac{R}{2pC}}\sqrt{1 + j\frac{pL}{R}} \quad (1)$$

$$Z = A - iB = \frac{(1 + ipC_1 R_1)R_0}{1 + ipC_1(R_0 + R_1)} \quad (2)$$

$$Z_2 = A_2 - iB_2 = R_2 - i/pC_2 \quad (3)$$

In the foregoing formulæ, D and Q are both real and are the resistance and reactance components respectively of the characteristic impedance K; similarly A and B are the resistance and reactance components respectively of the impedance Z; and $A_2$ and $B_2$ the resistance and reactance components of the impedance $Z_2$.

In order that the artificial line shall simulate the impedance K of the cable circuit it is evident that, for the telephonic range, A plus $A_2$ must approximate D in value and B plus $B_2$ must approximate Q in value. To this end the elements $R_0$, $R_1$, $R_2$, $C_1$ and $C_2$ must be proportioned with reference to the given values of R, L and C. In order to derive the proper proportioning it is convenient to introduce certain parameters which determine the values of the five impedance elements and which are themselves determined by the characteristics of the actual cable. First let the symbol $p'$ be defined by $$p' = \frac{1}{(R_0+R_1)C_1} \quad (4)$$

$p'$ is $2\pi$ times the frequency $f'$ below which impedance-simulation is not necessary. $f'$ is generally to be taken in practice as approximately 200 cycles per second, since frequencies below this value are not necessary for the telephonic transmission of speech. Further let $W=p/p'$. W is clearly the ratio of the frequency $f$ to the frequency $f'$. Now let the following equations define a set of parameters:

$$D_0 = \sqrt{\frac{R}{2p'C}} \quad (5)$$

$$t = R_0/D_0 \quad (6)$$

$$g = p'C_1R_1 \quad (7)$$

$$d = (1-g)t \quad (8)$$

By equation (2)

$$\frac{Z}{R_0} = \frac{1+ipC_1R_1}{1+ipC_1(R_0+R_1)}$$

But by (6)

$$\frac{1}{R_0} = \frac{1}{tD_0}$$

whence $$\frac{Z}{tD_0} = \frac{1+ipC_1R_1}{1+ipC_1(R_0+R_1)}$$

Substitute $wp'$ for $p$ and we get $$\frac{Z}{tD_0} = \frac{1+iwp'C_1R_1}{1+iwp'C_1(R_0+R_1)}$$

But $p'C_1R_1 = g$ by (7) and $p'(R_0+R_1)C_1 = 1$ by (4), whence $$\frac{Z}{tD_0} = \frac{1+igw}{1+iw} \quad (11)$$

Rationalizing (11) we get $$\frac{Z}{tD_0} = \frac{(1+igw)(1-iw)}{(1+iw)(1-iw)} = \frac{1+gw^2}{1+w^2} - i\frac{w(1-g)}{1+w^2}$$

From (2) $Z = A - iB$. Substituting this value for Z in the above equation we have $$\frac{A}{tD_0} - i\frac{B}{tD_0} = \frac{1+gw^2}{1+w^2} - i\frac{w(1-g)}{1+w^2}$$

Equating real and imaginary parts $$\frac{A}{tD_0} = \frac{1+gw^2}{1+w^2} = 1-(1-g)\frac{w^2}{1+w^2} = u \quad (12)$$

and $$\frac{B}{tD_0} = \frac{w(1-g)}{1+w^2}$$

But by (8)

$$(1-g) = \frac{d}{t}$$

whence $$\frac{B}{tD_0} = \frac{wd}{t(1+w^2)}$$

whence $$\frac{B}{dD_0} = \frac{w}{1+w^2} = v \quad (13)$$

In equations (12) and (13) $u$ and $v$ have the values indicated by said equations.

Further by reference to equation (3) it may be shown that $$u_2 = \frac{A_2}{tD_0} = \frac{R_2}{tD_0} \quad (14)$$

$$v_2 = \frac{B_2}{dD_0} = \frac{1}{p'c_2dD_0w} = \frac{h}{w} \quad (15)$$

where $$h = \frac{1}{p'C_2dD_0} \quad (16)$$

and $u_2$ and $v_2$ are defined by equations (14) and (15).

Equation (1) may be expressed $$K = D - iQ = \sqrt{\frac{R+ipL}{ipC}}$$

$$= \sqrt{\frac{R+iwp'L}{iwp'C}}$$

since $p = wp'$.

Further reduced this expression becomes $$K = D - iQ = \sqrt{i\frac{2}{w}\frac{R}{2p'C} + \frac{L}{C}}$$

$$= \sqrt{\frac{R}{2p'C}}\sqrt{\frac{2}{iw} + \frac{2p'L}{R}}$$

$$= \sqrt{\frac{R}{2p'C}}\sqrt{2\left(r - \frac{i}{w}\right)}$$

since $r = \frac{p'L}{R}$.

Also $\sqrt{\frac{R}{2p'C}} = D_0$ by equation (5) whence $$\frac{D}{D_0} - i\frac{Q}{D_0} = \sqrt{2\left(r - \frac{i}{w}\right)}$$

Therefore $$\frac{D}{D_0} = \text{real part of } \sqrt{2\left(r - i\frac{1}{w}\right)}$$

$$\frac{Q}{D_0} = \text{imaginary part of } \sqrt{2\left(r - i\frac{1}{w}\right)}$$

If $a$ and $b$ denote $\frac{D}{tD_0}$ and $\frac{Q}{dD_0}$ respectively, then by equation (1)

$$a = \frac{D}{tD_0} = \frac{1}{t}\text{ real part}\left(\sqrt{2\left(r - i\frac{1}{w}\right)}\right) \quad (17)$$

$$b = \frac{Q}{dD_0} = \frac{1}{d}\text{ imaginary part}\left(\sqrt{2\left(r - i\frac{1}{w}\right)}\right) \quad (18)$$

Since the difference between D and A must be approximately equal to $R_2$ it follows that $a - u$ must have a value, denoted by $s$, which is approximately independent of the frequency, whence $$R_2 = stD_0 \quad (19)$$

Collecting the foregoing formulæ and solving for the five impedance elements, $$\left.\begin{array}{l} R_0 = tD_0 \\ R_1 = \dfrac{g}{1-g}tD_0 \\ C_1 = \dfrac{1-g}{p'tD_0} \\ R_2 = stD_0 \\ C_2 = \dfrac{1}{hp'dD_0} \end{array}\right\} A$$

The determination of the constants of the artificial line of my invention will now be given for the specific case where it is required that the artificial line shall simulate the characteristic impedance of a cable circuit having the following constants, R=20.8 ohms; L=.0011 henry; C=.0855×10⁻⁶ farad. The first step is to decide on the value of $p'$. In the present case it will be assumed that the impedance simulation is relatively unimportant for frequencies below 240 cycles per second, whence $p' = 2\pi f' = 1508$ approximately. The value L/R is .0011÷20.8, whence by definition $$r = \frac{p'L}{R} = .08$$

and by equation (5)

$$D_0 = \sqrt{\frac{R}{2p'C}} = 284$$

Figure 2:
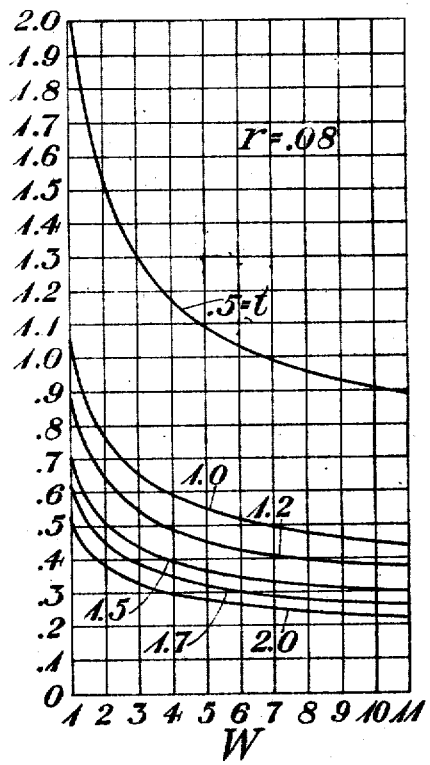
Figure 3:
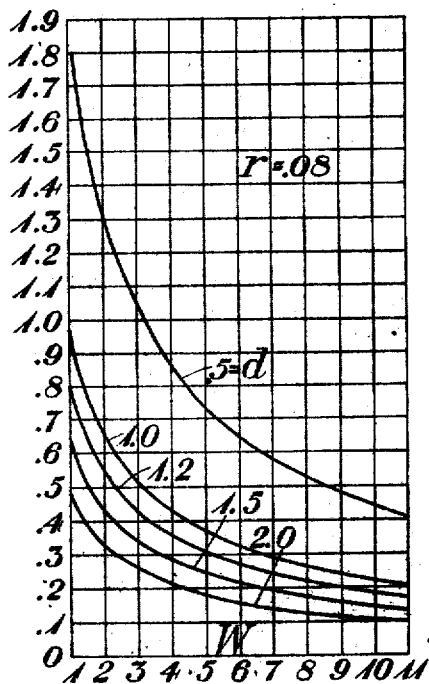

The next step is to substitute the value .08 for $r$ in equations (17) and (18) and to compute from said equations curves of $a$ and $b$ with respect to $w$ for different values of the parameters $t$ and $d$ respectively. The curves for $a$ and $b$ are illustrated in Figs. 2 and 3 respectively. Referring to Fig. 2, said figure shows a family of curves for values of the parameter $t$ ranging from $t=.5$ to $t=2.0$, each curve being a plot of equation (17) for a definite value of $t$, the ordinates being values of $a$ corresponding to the values of the abscissæ $w$. Fig. 3 shows a family of curves each of which is a plot of equation (18) for a particular value of the parameter $d$, the values of said parameter extending from $d=.5$ to $d=2.0$.

Figure 4:
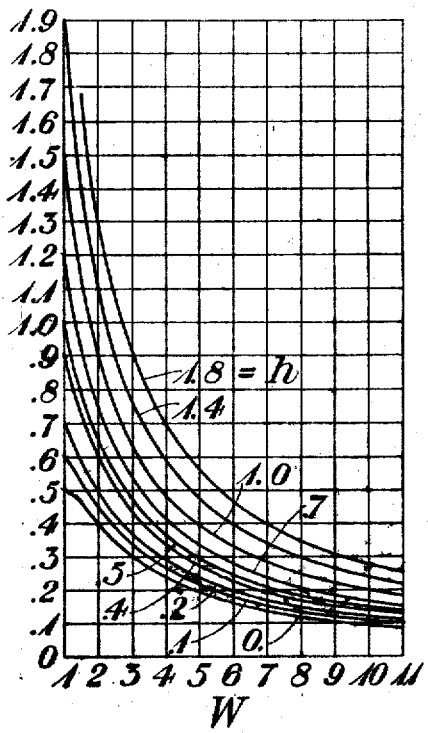

The third step is to plot graphs of $v$ and $v_2$ as given by equations (13) and (15). Fig. 4 is a plot of $v+v_2$ as ordinates against W as abscissæ, the figure showing a family of curves each of which is a plot for a particular value of the parameter $h$, the value of said parameter ranging from $h=.1$ to $h=1.8$.

Figure 5:
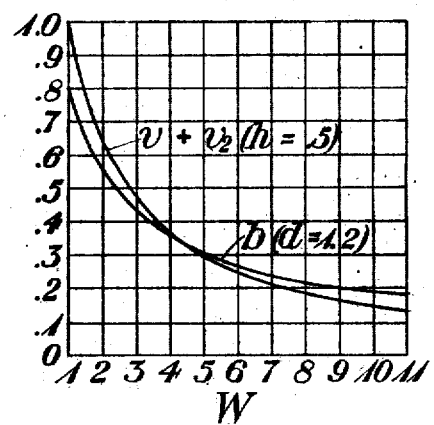

Now it is evident from inspection of equations (18), (13) and (15) that in order that the artificial line reactance shall simulate the reactance component of the characteristic impedance of the cable circuit $v+v_2$ must be closely equal to $b$ over the range of frequencies necessary for telephonic transmission. This range will be taken as extending from 240 to 2400 cycles per second, which values correspond to W=1 and W=10 respectively. The next step is then to compare Figs. 3 and 4 and to determine the values of the parameters $h$ and $d$ for which the plots $b$ and $v+v_2$ are most closely equal over the range of frequencies corresponding to the limits W=1 and W=10. A detailed comparison of Figs. 3 and 4 leads thus to the choice of $h=.5$ and $d=1.2$. Fig. 5 shows two curves, one that of $b$ for $d=1.2$ and the other that of $v+v_2$ for $h=.5$; said curves clearly show the high degree of precision with which the reactance of the artificial line simulates that of the cable over the specified range.

Figure 6:
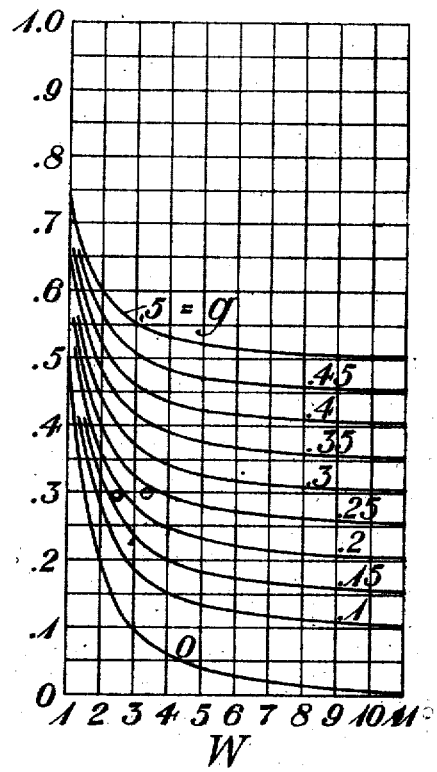
Figure 7:
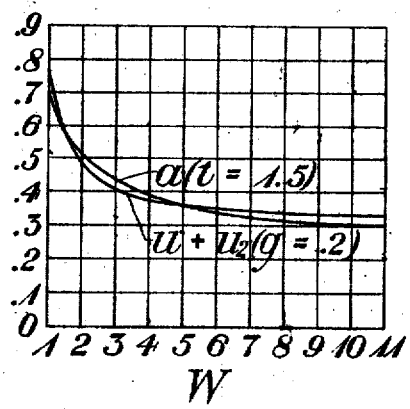

Having determined the best values of the parameters $h$ and $d$ as illustrated above, the next step is to plot the values of $u$ as ordinates against values of $w$ as abscissæ for different values of the parameter $g$. The family of curves resulting from said plots are illustrated in Fig. 6, each curve being plotted for a particular value of the parameter $g$. Now since the values of $u+u_2$ must approximate over the required frequency range, the values of $a$ in order that the resistance components of the impedances of the artificial line and the cable circuit shall be approximately equal, and since $u_2$ is independent of the frequency, the proper values of the parameters $g$ and $t$ are to be chosen by a comparison of Figs. 2 and 6, the parameters being so chosen that the difference between $u$ and $a$ shall be approximately independent of the abscissæ $w$ and hence of the frequency. This at the same time determines the parameter $s$ which is $a-u$. The parameters $g$ and $t$ are not independent since they are subject to the relation $d=t(1-g)$ and hence a compromise value must be selected. For the particular example under consideration, I have chosen $g=.2$, $t=1.5$ and $s=.128$ from a study of Figs. 2 and 6. Having selected these values for the parameters, I have illustrated in Fig. 7 the degree of precision with which the resistance component of the impedance of the artificial line simulates the resistance component of the impedance of the cable circuit. Referring to Fig. 7 two curves are plotted against $w$ as abscissæ, one being that of $a$ and the other that of $u+u_2$. Since $a$ and $u+u_2$ are proportional to $D$ and $A+A_2$ respectively, said curves clearly show the degree of precision obtained.

Since the parameters $h$, $d$, $g$, $t$ and $s$ are now determined as well as $r'$, $p'$ and $D_0$, the constants of the artificial can be evaluated directly from design formulæ (A), which, for the particular example under discussion lead to the following values:

$R_0 = 426$ ohms
$R_1 = 106$ ohms
$R_2 = 54$ ohms
$C_1 = 1.25 \times 10^{-6}$ farads
$C_2 = 3.89 \times 10^{-6}$ farads

What is claimed is:

1. An artificial line for simulating the characteristic impedance of a cable circuit whose constants are uniformly distributed comprising a part consisting of a condenser and a non-inductive resistance in series with said condenser, and a second part serially connected with said first mentioned part and consisting of a second non-inductive resistance in parallel with the serial combination of a second condenser and a third non-inductive resistance, the elements of the artificial line being so proportioned that the sum of the resistance component of the characteristic impedance of the first part and the resistance component of the characteristic impedance of the second part approximates the resistance component of the characteristic impedance of the cable circuit, and the sum of the reactance components of the characteristic impedances of the two parts approximate the reactance component of the characteristic impedance of the cable circuit.

2. An artificial line for simulating the characteristic impedance of a cable circuit whose constants are uniformly distributed consisting of two serially connected parts, one part comprising a resistance and a capacity with a second resistance in shunt therewith, and the other part comprising a resistance and capacity, the elements of the artificial line being so proportioned that the sum of the resistance components and the sum of reactance components of the characteristic impedances of the two parts shall respectively approximate the resistance and reactance components of the cable circuit.

In testimony whereof, I have signed my name to this specification in the presence of two subscribing witnesses, this 20th day of January 1917.

RAY S. HOYT.

Witnesses:
C. C. ROSE,
FRED'K S. ROBINSON.